US012695740B2

(12) United States Patent
Akkarakaran Jose et al.

(10) Patent No.: US 12,695,740 B2
(45) Date of Patent: Jul. 28, 2026

(54) SYSTEMS AND METHODS FOR INDEPENDENTLY SOURCED AUTHENTICATION DURING REMOTE NETWORK SESSIONS

(71) Applicant: Capital One Services, LLC, McLean, VA (US)

(72) Inventors: John Akkarakaran Jose, McLean, VA (US); Rajat Gupta, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 153 days.

(21) Appl. No.: 18/443,215

(22) Filed: Feb. 15, 2024

(65) Prior Publication Data

US 2025/0267139 A1     Aug. 21, 2025

(51) Int. Cl.
*H04L 9/40* (2022.01)

(52) U.S. Cl.
CPC ................................. *H04L 63/083* (2013.01)

(58) Field of Classification Search
CPC .... H04L 63/08; H04L 63/083; H04L 63/0853
USPC ............................................................ 726/6
See application file for complete search history.

(56) References Cited

U.S. PATENT DOCUMENTS

| | | | | |
|---|---|---|---|---|
| 10,742,632 | B2 * | 8/2020 | Yefimov | ................. H04L 63/08 |
| 11,941,684 | B2 * | 3/2024 | Zhou | ..................... H04L 67/306 |
| 12,225,003 | B2 * | 2/2025 | Novick | ................. H04L 63/083 |
| 2015/0371026 | A1 * | 12/2015 | Gnanasekaran | ........ G06F 21/35 726/7 |
| 2016/0373427 | A1 * | 12/2016 | Yefimov | ................. H04L 63/08 |
| 2017/0193471 | A1 * | 7/2017 | Kettler | ................. G06Q 20/102 |
| 2019/0273730 | A1 * | 9/2019 | Yefimov | ............... H04W 12/06 |
| 2020/0213114 | A1 * | 7/2020 | Sarin | ..................... H04L 9/3231 |

OTHER PUBLICATIONS

A Formal Security Analysis of the W3C Web Payment APIs: Attacks and Verification, Do et al, May 2022 (Year: 2022).*

* cited by examiner

*Primary Examiner* — Jahangir Kabir
(74) *Attorney, Agent, or Firm* — Foley & Lardner LLP

(57) ABSTRACT

Systems and methods use independently sourced authentication for a bifurcated authentication process. For example, in furtherance of authentication of devices in a first device session (e.g., between a user and an interface provider), the systems and methods create a second device session (e.g., between the interface provider and an independent authentication source). To do so, the interface provider may facilitate the transmission of information from the user to the independent authentication source. The independent authentication source may use information (e.g., information only accessible to the independent authentication source) to authenticate the information provided by the user. The independent authentication source may then authenticate the user. By doing so, the interface provider has relied on information known to the other parties (e.g., the user and the independent authentication source) to authenticate the user.

20 Claims, 6 Drawing Sheets

400

Establish a first device session between a user and an interface provider

402

Establish a second device session between the interface provider and an independent authentication source

404

Transmit the authentication information

406

Receive a unique token

408

Use the unique token during the first device session

410

<u>500</u>

Receive an authentication request from an interface provider

502

Retrieve authentication information

504

Retrieve user profile information

506

Authenticate user for a device session

508

Generate a unique token

510

Transmit the unique token to interface provider

512

SYSTEMS AND METHODS FOR INDEPENDENTLY SOURCED AUTHENTICATION DURING REMOTE NETWORK SESSIONS

BACKGROUND

Network communications are increasing globally. For example, the widespread adoption of the Internet for various purposes, including business, education, entertainment, and communication, has led to a continuous rise in network traffic. Additionally, the proliferation of Internet of Things (IoT) devices, such as smart home devices, wearables, and industrial sensors, contributes to the growth of network communications. These devices often require connectivity for data exchange and control. As another example, the shift toward cloud-based services and applications has increased the demand for data center connectivity and high-speed network communications. Businesses and individuals rely on cloud services for storage, computing power, and collaboration tools, including for conducting virtual meetings, collaborating online, and using cloud-based productivity tools. Finally, the growth of e-commerce has led to increased online transactions, further contributing to the demand for secure and reliable network communications.

In many instances, network communications require some type of authentication. Authentication is the process of verifying the identity of an individual, system, and/or entity to ensure that they are who or what they claim to be. It is a crucial component of cybersecurity and access control. Authentication typically involves the use of credentials such as usernames and passwords, biometric data (like fingerprints or facial recognition), security tokens, or other means to validate the identity of a user or system.

For example, networks are susceptible to various security threats, such as eavesdropping, man-in-the-middle attacks, and packet sniffing. These vulnerabilities make it challenging to transmit authentication information securely between the client and the server. Similarly, authentication credentials (such as usernames and passwords) may be intercepted by attackers if proper encryption mechanisms are not in place. This interception could lead to unauthorized access. Attackers may then attempt to impersonate a legitimate user or device to gain unauthorized access to the network using stolen credentials or exploiting weaknesses in the authentication process.

SUMMARY

To address these challenges, network administrators often implement strong encryption protocols, multi-factor authentication, intrusion detection/prevention systems, and continuous monitoring to enhance the overall security of network authentication processes. However, despite the enhanced robustness, strong encryption protocols can still be infiltrated and multi-factor authentication can still be accessed via unauthorized parties (e.g., via man-in-the-middle attacks). Once the unauthorized parties have accessed the multi-factor authentication credentials, the overall security of an account and/or various functions provided by the account are open to attack.

In view of these challenges to conventional network security, despite enhanced robustness, the systems and methods use independently sourced authentication for a bifurcated authentication process. For example, in furtherance of authentication of devices in a first device session (e.g., between a user and an interface provider), the systems and methods may create a second device session (e.g., between the interface provider and an independent authentication source). To do so, the interface provider may facilitate the transmission of information from the user to the independent authentication source. The independent authentication source may use information (e.g., information only accessible to the independent authentication source) to authenticate the information provided by the user. The independent authentication source may then authenticate the user. By doing so, the interface provider has relied on information known to the other parties (e.g., the user and the independent authentication source) to authenticate the user.

However, even the use of the independent authentication source may not prevent man-in-the-middle attacks or limit the actions of an unauthorized user if the unauthorized user is able to gain access to an account. To overcome this technical problem, the systems and methods bifurcate the authentication process using the independent authentication source. For example, upon authenticating a user, the independent authentication source may transmit a unique token to the interface provider (e.g., without the user even having access to the unique token). In some embodiments, the system may also send a request for a user confirmation to transmit the unique token. The unique token may authorize the interface provider to perform one or more actions (e.g., according to one or more conditions specific to the token, such as time length, specified communications/transactions, etc.) during the first device session. Notably, because the user never has access to the unique token, and the unique token is specific to the device session, an unauthorized user is never able to gain access to the account beyond the scope authorized by the unique token.

In some aspects, systems and methods for providing independently sourced authentication during remote network sessions are described. For example, the system may establish a first device session between a user and an interface provider using a non-native account. The system may (e.g., during the first device session) query the user for authentication information. The system may receive the authentication information. The system may, in response to receiving the authentication information, establish a second device session between the interface provider and an independent authentication source. The system may use the second device session to transmit the authentication information to the independent authentication source. The system may receive a unique token, from the independent authentication source, based on a user authentication of the user by the independent authentication source using the authentication information. The system may use the unique token to populate a communication between the user and the interface provider during the first device session.

In some aspects, systems and methods for preventing man-in-the-middle cyberattacks using independently sourced authentication during remote network sessions are described. For example, the system may receive, by an independent authentication source, an authentication request from an interface provider, wherein the authentication request requests authentication of a user with the interface provider during a first device session between the interface provider and the user. The system may retrieve, by the independent authentication source, authentication information from the authentication request. The system may retrieve, by the independent authentication source, user profile information for the user. The system may authenticate the user for the first device session by comparing the authentication information to the user profile information. The system may, in response to authenticating the user, generate a unique token for the first device session. The system may transmit the unique token to the interface provider.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "of" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
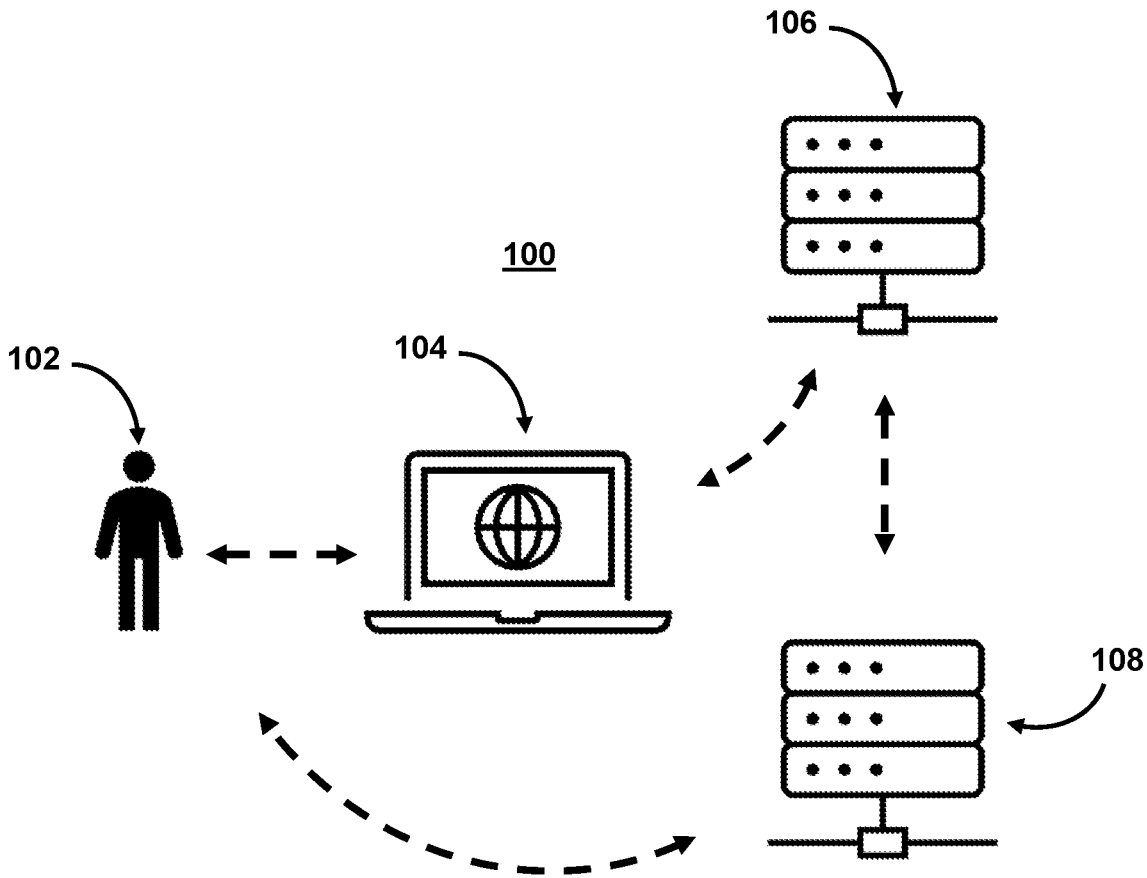
FIGS. 1A-1B show an illustrative diagram for a system used for independently sourced authentication, in accordance with one or more embodiments.
Figure 1B:
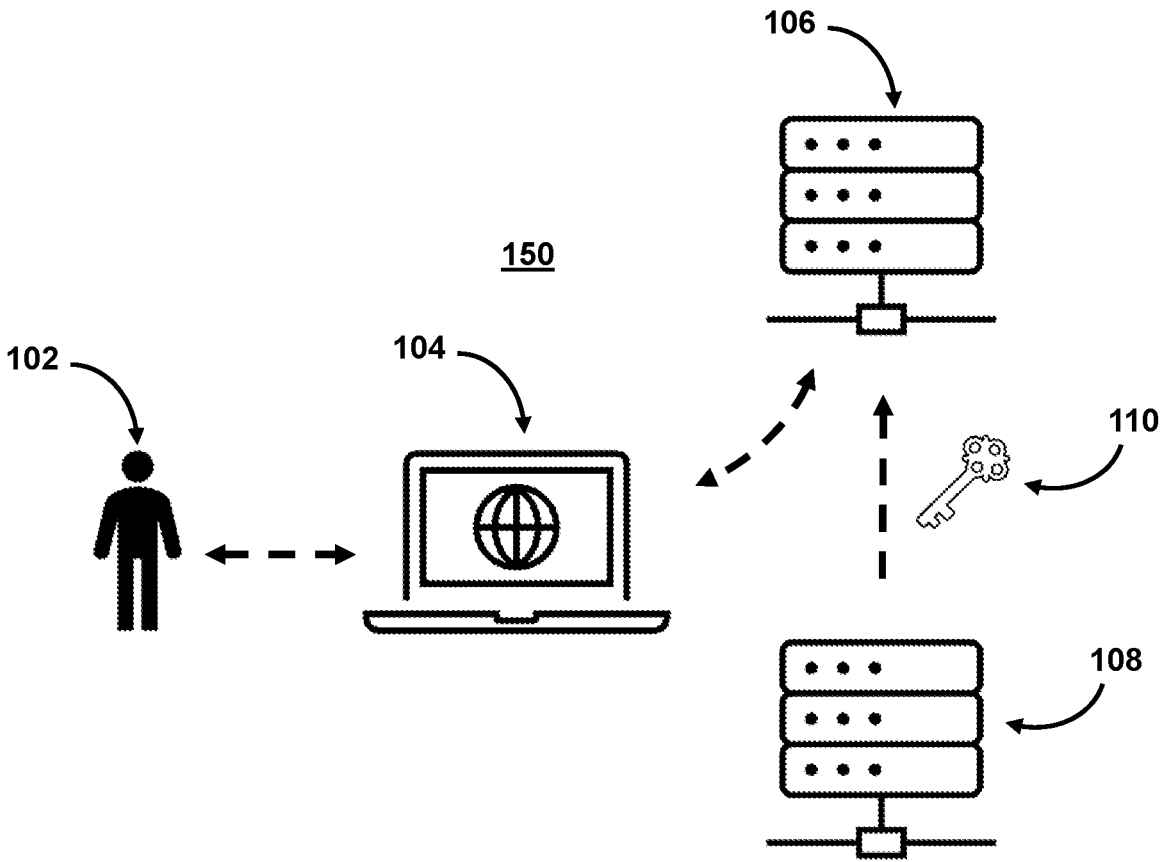

FIGS. 1A-1B show an illustrative diagram for a system used for independently sourced authentication, in accordance with one or more embodiments. For example, in furtherance of authentication of devices in a first device session (e.g., between a user (e.g., user 102) and an interface provider (e.g., interface provider 106 via user interface 104)), the system may create a second device session (e.g., between the interface provider (e.g., interface provider 106) and an independent authentication source (e.g., independent authentication source 108)). For example, user 102 may be attempting to authenticate themselves via user interface 104.

As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

During authentication, user 102 may attempt to authenticate themselves and/or use a non-native account. For example, a native account for interface provider 106 may correspond to an account provided by interface provider 106 that is specific to user 102. In contrast, a non-native account may correspond to an account that is not provided by interface provider 106 and/or not specific to user 102.

For example, a native account may correspond to an online account. An online account may refer to a user's account or profile that is created on a website, platform, and/or service on the Internet. It may involve providing personal information, such as a username, password, and often an email address, to create a unique and secure identity for the user within that online system. An online account may help identify and authenticate users when they access a website or service. This authentication is often done through the use of a username and password. Having an account may allow users to personalize their experience on a website. This may include saving preferences, storing billing and shipping information, and accessing personalized content. Secure online accounts help protect users' personal information and ensure that only authorized individuals can access certain features or data. For e-commerce platforms, having an online account allows users to track their order history, view past transactions, and manage shipping and billing information. Online accounts often facilitate communication between the user and the platform, enabling notifications, newsletters, and updates to be sent to the user's registered email address.

In contrast, a non-native account may correspond to a guest account and/or a temporary account used during a guest checkout. Guest checkout may refer to the option that allows customers to make a purchase from an online store without creating an account or logging in. Instead of requiring users to register and provide personal information, guest checkout allows them to complete a transaction by providing only the necessary information for shipping and payment. This feature is designed to streamline the online shopping experience, making it quicker and more convenient for customers. It is particularly useful for those who may not want to create an account or go through a lengthy registration process but still want to make a one-time purchase. Guest checkout helps reduce friction in the checkout process, potentially increasing conversion rates for online retailers.

In FIG. 1A, user 102 may be attempting to establish a first device session with interface provider 106 via user interface 104. If user 102 is using a non-native account, the system may attempt to authorize user 102. For example, FIG. 1A shows system 100. In FIG. 1A, user 102 may attempt to generate a first device session between user 102 (e.g., via user interface 104) and interface provider 106.

A device session may refer to a period of time during which a user (or other device) interacts with a particular device while accessing a system, application, and/or online service. The concept of a device session is often used in the context of web applications, mobile apps, and other digital platforms. A device session may be defined by one or more characteristics. One characteristic may be duration. For example, a device session starts when a user accesses a system using a specific device (e.g., computer, smartphone, tablet) and ends when the user logs out, closes the application, or a certain period of inactivity occurs. Another characteristic may be user interaction. For example, the session includes all the user's interactions with the system during that time, such as navigating through pages, submitting forms, and interacting with various features. Another characteristic may be authentication. For example, during a device session, the user is typically authenticated by providing login credentials. The system associates the user's actions with their identity, allowing for personalized experiences and secure access to account-related information. Another characteristic may be session management. For example, the system may employ session management mechanisms to handle user sessions effectively. This includes generating session tokens, managing session expiration, and providing security features such as session timeouts. Another characteristic may be security considerations. For example, device sessions may be crucial for security, as they help prevent unauthorized access. Secure practices involve mechanisms such as session tokens, encrypted communication, and periodic reauthentication. In some cases, users may have sessions that span multiple devices. For example, a user might start a session on a computer and continue it later on a smartphone. Some systems offer persistent sessions, allowing users to stay logged in across multiple sessions or even after closing and reopening the application or website. This is often achieved through features such as "Remember Me" functionality.

The system may perform several steps to establish the device session. For example, when user 102 attempts to access a system, they need to provide authentication credentials, such as a username and password. The system verifies these credentials against data stored by independent authentication source 108. Upon successful authentication by independent authentication source 108, the system generates a unique session token (e.g., token 110 (FIG. 1B)) associated with the authenticated user and the specific device used. This session token serves as a key to identify the user during the session.

The system may mark the beginning of the session, associating the session token with the user's interactions on the device. The session token is typically stored in a secure manner, such as in a cookie on the user's device or as part of the uniform resource locator (URL) parameters. During the session, user 102 may interact with interface provider 106 by navigating through pages, submitting forms, and accessing various features on user interface 104. The system may monitor user activity and manage the session. This includes tracking session duration, handling inactivity timeouts, and managing session state. To enhance security, system 100 may use secure protocols (e.g., HyperText Transfer Protocol Secure (HTTPS)) to encrypt communication between the user's device and the server. Session tokens may be periodically rotated or refreshed to mitigate security risks. The session ends when the user logs out explicitly, the session expires due to inactivity, or the user closes the application or browser.

As shown in FIG. 1A, user 102 may communicate directly with independent authentication source 108. For example, independent authentication source 108 may store a user profile for user 102. The user profile may include information only available to and/or accessible by independent authentication source 108. The information in the user profile may be used by independent authentication source 108 to independently authenticate user 102.

For example, the system (e.g., independent authentication source 108) may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user. User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring.

In the context of device sessions conducting financial transactions, an independent authentication source is an external and secure system or method that verifies the identity of the user before allowing access to financial services or the execution of transactions. This additional layer of authentication is often employed to enhance security, especially in situations where sensitive financial operations are involved. This may involve using a combination of two independent authentication factors to verify a user's identity. Common factors include something the user knows (password), and something the user has (e.g., a one-time code sent to a mobile device). Biometric data such as fingerprints, facial recognition, or voice recognition may be utilized as an independent source of authentication. Biometrics provide a unique and personal identifier for each user. In some embodiments, physical devices, often in the form of a small token or key fob, that generate time-based or event-based codes are utilized. Users must possess the physical token to complete the authentication process. Mobile applications that generate one-time codes or facilitate biometric authentication may also be utilized. These apps are often linked to the user's account and provide an additional layer of security by sending a verification code to the user's registered mobile number or email address. The user must enter the received code to complete the authentication process. Physical cards with embedded chips that provide secure authentication may also be utilized. These cards may require users to enter a personal identification number (PIN) or use other verification methods. The authentication method may involve analyzing various factors such as user behavior, device information, and location to assess the risk associated with a transaction. High-risk transactions may trigger additional authentication steps. For certain financial transactions, users may need to confirm their identity using a separate device, such as a dedicated authentication device or a card reader. In some cases, financial institutions may require users to verify their identity by providing scanned copies of government-issued identification documents. By incorporating an independent authentication source, financial institutions aim to add an extra layer of security, reducing the risk of unauthorized access or fraudulent transactions during device sessions conducting financial operations. The choice of authentication method often depends on the security requirements, user experience considerations, and regulatory compliance.

In some embodiments, system 100 may represent parallel device sessions being established by different parties during bifurcated authentication. Parallel device sessions between different parties refer to the simultaneous use of multiple devices by distinct users or entities to access the same system, application, or platform. Each party engages in its own device session, allowing independent interactions and transactions. This concept is relevant in various contexts, such as collaborative environments, shared systems, or multi-user applications. Different parties, individuals, or entities engage in separate device sessions concurrently. Each party is associated with its own set of interactions and activities. Users from different devices can access the system or application simultaneously without interfering with each other's sessions. Each session operates independently. Parallel device sessions may be used in collaborative environments where multiple users need to work together on shared tasks or projects. Examples include online document editing, collaborative design tools, or shared virtual spaces. Some applications are designed to support multiple users interacting concurrently. Online games, virtual meetings, and collaborative software are examples where parallel device sessions occur. For example, the system may ensure the security and isolation of parallel device sessions to prevent unauthorized access or data leakage between different parties. Proper authentication and session management are critical. In collaborative scenarios, real-time synchronization of data and actions across different device sessions may be required to maintain consistency among users. In collaborative environments, users may also need the ability to share data, files, or information with others engaged in parallel device sessions.

In FIG. 1B, user interface 104 may be attempting to establish a second device session with independent authentication source 108. As shown in FIG. 1B, system 150 may include interface provider 106 and independent authentication source 108 sharing token 110. As described herein, an authentication token may be a piece of data that is used to verify the identity of a user during the authentication process. It may be used in systems, applications, and services to ensure that users have the necessary permissions to access certain resources or perform specific actions. Authentication tokens serve as a secure and efficient way to manage user sessions. For example, authentication tokens are used to prove the identity of a user. Once a user is authenticated (i.e., their identity is verified), a token is issued, allowing the user to perform actions or access resources without re-entering their credentials for each interaction.

However, even the use of the independent authentication source may not prevent man-in-the-middle attacks or limit the actions of an unauthorized user if the unauthorized user is able to gain access to an account. To overcome this technical problem, the system may bifurcate the authentication process using independent authentication source 108. For example, upon authenticating a user, the independent authentication source may transmit a unique token to the interface provider (e.g., without the user even having access to the unique token). The unique token may authorize the interface provider to perform one or more actions (e.g., according to one or more conditions specific to the token, such as time length, specified communications/transactions, etc.) during the first device session. Notably, because the user never has access to the unique token, and the unique token is specific to the device session, an unauthorized user is never able to gain access to the account beyond the scope authorized by the unique token.

A token may have various token types. Session tokens are generated upon successful user authentication and are used to maintain a user's session. They are associated with a specific user and device during a session. In the context of OAuth and similar authorization frameworks, access tokens are issued to enable a third-party application to access specific resources on behalf of a user. Often used in conjunction with access tokens, refresh tokens are used to obtain a new access token without requiring the user to re-enter their credentials. A specific format of token is encoded as a JSON Web Token (JWT). JWTs are commonly used for secure transmission of information between parties.

Tokens are typically generated by the authentication server after successful user authentication. Independent authentication source 108 may then issue the token to interface provider 106, without sharing token 110 with user 102. This storage can be in the form of hypertext transfer protocol (HTTP) cookies, local storage, or other secure storage mechanisms. Tokens may have an expiration time to enhance security. After expiration, users may need to reauthenticate to obtain a new token. Tokens are designed to be tamper-resistant. They are often encrypted or digitally signed to prevent unauthorized modification or impersonation. In the context of web application programming interfaces (APIs), authentication tokens are commonly used to authorize and authenticate requests from clients. The client includes the token in the request headers to access protected resources.

Independent authentication source 108 may be a database configured to store user data for a user. For example, the database may include user data that the verification service has collected about the user through prior transactions. Alternatively or additionally, the verification service may act as a clearing house for multiple sources of information about the user. When verifying the user's credentials, the system may access these multiple sources. Independent authentication source 108 may also include control circuitry configured to perform the various operations needed to verify the credentials of the user. For example, independent authentication source 108 may receive, from user 102, a verification request for credentials of the user and user-provided data corresponding to the verification request.

The verification request may be structured as an API request that includes a URL, body, and method. The API request may correspond to one-half of the API request-response cycle between one or more devices and/or applications to complete the verification request. For example, the system (e.g., user 102 and independent authentication source 108) may communicate in HTTP through a request-response cycle. To make a valid request, the requestor (e.g., user 102) may include a URL, method, list of headers, and/or body. The URL may indicate to the verification service what resources to use (e.g., "VerificationServiceApplication"). The body may contain headers and data. The headers may provide metadata about the verification request (e.g., the types of information included) and the body may indicate the name of the user for which credentials need to be verified, user-provided data, and other information used by the verification service.

For example, the verification request may indicate a type of the verification request, an identity of a requestor of the verification request, and a required type of assurance level of the verification request. For example, the verification service may have multiple types of verification requests, which may differ by the subject matter of the request, the service being performed, a monetary amount at issue in the request, etc. The system may have custom rules and requirements for each verification request. The identity of the requestor may be transmitted as a company name, as an account number with the verification service, and/or as any other identifier that allows the verification to distinguish the requestor from other requestors. Finally, the verification request may include a type of assurance level. The type of assurance level may include whether the assurance level is a qualitative or quantitative assessment of the confidence in the verification service's assurance. For example, the level of assurance may be expressed as a percentage of confidence, a tier of confidence (e.g., a grade), and/or a binary decision. The system may express the assurance level as a textual, graphical, and/or multimedia indicator (e.g., on user 102).

Independent authentication source 108 may determine a category of required data for the verification request based on the type of the verification request, the identity of the requestor, and the required type of assurance level. In some embodiments, the determination of what categories of user data are required for the verification request based on the type of the verification request, the identity of the requestor, and the required type of assurance level may be made based on industry standards, legal requirements (e.g., to protect the privacy of the user), and/or subject matter.

Independent authentication source 108 may determine whether the user-provided data includes the category. As the naming conventions, format, and value types of the category may differ from that of the user data, independent authentication source 108 may use matching algorithms that may support exact match techniques and/or partial or "fuzzy" matching logic (e.g., searching for a closest match) to locate alternate spellings, naming conventions, etc. for user data. For example, a column name associated with user data may be compared to a required category (e.g., debt level) for the verification request. Based on the degree of similarity between the headings, a "similarity rating" may be assigned using any suitable algorithm or weighting logic.

Upon determining that the user-provided data includes the category, independent authentication source 108 may verify the user-provided data in the category using the stored data. Independent authentication source 108 may once again use matching algorithms for this purpose. Additionally, independent authentication source 108 may look for substantial similarity of the values in order to verify the data. This may include looking for alternate spellings and/or number values (e.g., indicating income level) to be within a given range. In response to verifying the user-provided data in the category, independent authentication source 108 may select a default algorithm for responding to the verification request. The default algorithm may be selected by the requestor and/or a known industry standard (as the fact that the user provided the data negates the security and privacy concerns). Independent authentication source 108 may then generate an assurance level of the credentials of the user based on the default algorithm.

In contrast, in response to determining that the user-provided data does not include the category, independent authentication source 108 may determine whether the stored user data includes the category. If not, independent authentication source 108 may generate an API response to user 102 querying the user for user data and/or generate an API response to the requestor querying the requestor for user data. If so, independent authentication source 108 may select criteria based on the stored user data.

As referred to herein, the criteria or criterion based on user data (whether stored user data or user-provided data)

may include a normalized value based on the values associated with the user data included with the category. For example, a given category (e.g., fiscal health) may include multiple categories of underlying user data (i.e., actual user data) such as income level, debt level, etc. In generating a criterion or criteria for use, independent authentication source 108 generates a numerical score for each category of underlying data. For example, the income level of the user may be represented as a numerical value indicating the percentage of the general population that has a lower income level than the user. In another example, the debt level of the user may be represented as a numerical value indicating the percentage of the general population that has a lower debt level than the user. Non-numerical data points (e.g., gender, marriage status, number of children) may also be expressed as numerical values.

In some embodiments, independent authentication source 108 may determine whether criteria based on the stored user data in the category are approved for use in responding to the verification request in response to determining that the stored user data includes the category. For example, while no underlying user data (i.e., actual data) is being used, independent authentication source 108 may still verify that the user approves of this use.

Independent authentication source 108 may then select an algorithm that uses these criteria in order to generate the assurance level. For example, independent authentication source 108 may select an algorithm for responding to the verification request from a plurality of potential algorithms for responding to the verification request, wherein each of the plurality of potential algorithms uses the criteria and generates assurance levels in the required type. In some embodiments, the system may select the algorithm based on the type of the verification request, the identity of the requestor, and the required type of assurance level.

In some embodiments, the system may select the algorithm based on whether or not the requestor is a frequent or high-volume requestor. Alternatively, the system may determine whether the volume of requests is suspicious (e.g., a brute force hack). In response to the high volume of requests, the system may vary the algorithm or select different algorithms. For example, the system may determine a number of verification requests received from the requestor during a time period. The system may then compare the number of verification requests received from the requestor during the time period to a respective number for each of the plurality of potential algorithms. The system may then match the number of verification requests received from the requestor during the time period to the respective number of the selected algorithm.

In some embodiments, the system may select the algorithm based on a time limit for outputting assurance levels. For example, some algorithms may require longer computational periods to calculate. As the number of requests increases, the system may select algorithms that can be calculated more quickly in order to reduce bottlenecks. Alternatively, if there are no bottlenecks (or threats of bottlenecks), the system may select an algorithm that takes longer to calculate but is more accurate or used less frequently (e.g., in order to increase the diversity of algorithms). For example, the system may determine a time limit for outputting the assurance level. The system may then compare the time limit to a respective time limit for each of the plurality of potential algorithms. The system may then select an algorithm in response to matching the time limit to the respective time limit for the algorithm.

In some embodiments, the system may select the algorithm based on a geographic location of the remote server and/or the requestor. For example, regional, national, or geographic differences may cause differences in the expectation and/or legal requirements for the verification service. For example, the system may determine that a particular requestor is subject to particular data privacy rules that require the use of a particular algorithm. As such, the system may determine a geographic location of the remote server, and compare the geographic location to a respective approved geographic location for each of the plurality of potential algorithms. Upon matching the geographic location to the respective approved geographic location for the algorithm, the system selects the algorithm.

In some embodiments, the system may select the algorithm based on the type of user data being used. For example, some user's data (e.g., personally identifying information) may be subject to particular legal rules and therefore the system may select algorithms that meet those requirements. For example, the system may determine that the category includes a type of personally identifying information. The system may then select an algorithm from the plurality of algorithms approved for that type of data.

After selecting the algorithm and processing the criteria using the algorithm, independent authentication source 108 generates an assurance level, in the required type, of the credentials of the user based on the selected algorithm. For example, if the verification request requires a particular type of assurance level (e.g., one having a particular format, degree of confidence, etc.), independent authentication source 108 generates the assurance level using the selected algorithm. Independent authentication source 108 then outputs the assurance level for display to user 102 or on user interface 104. For example, the assurance level may be transmitted in the body of an API response.

Figure 2:
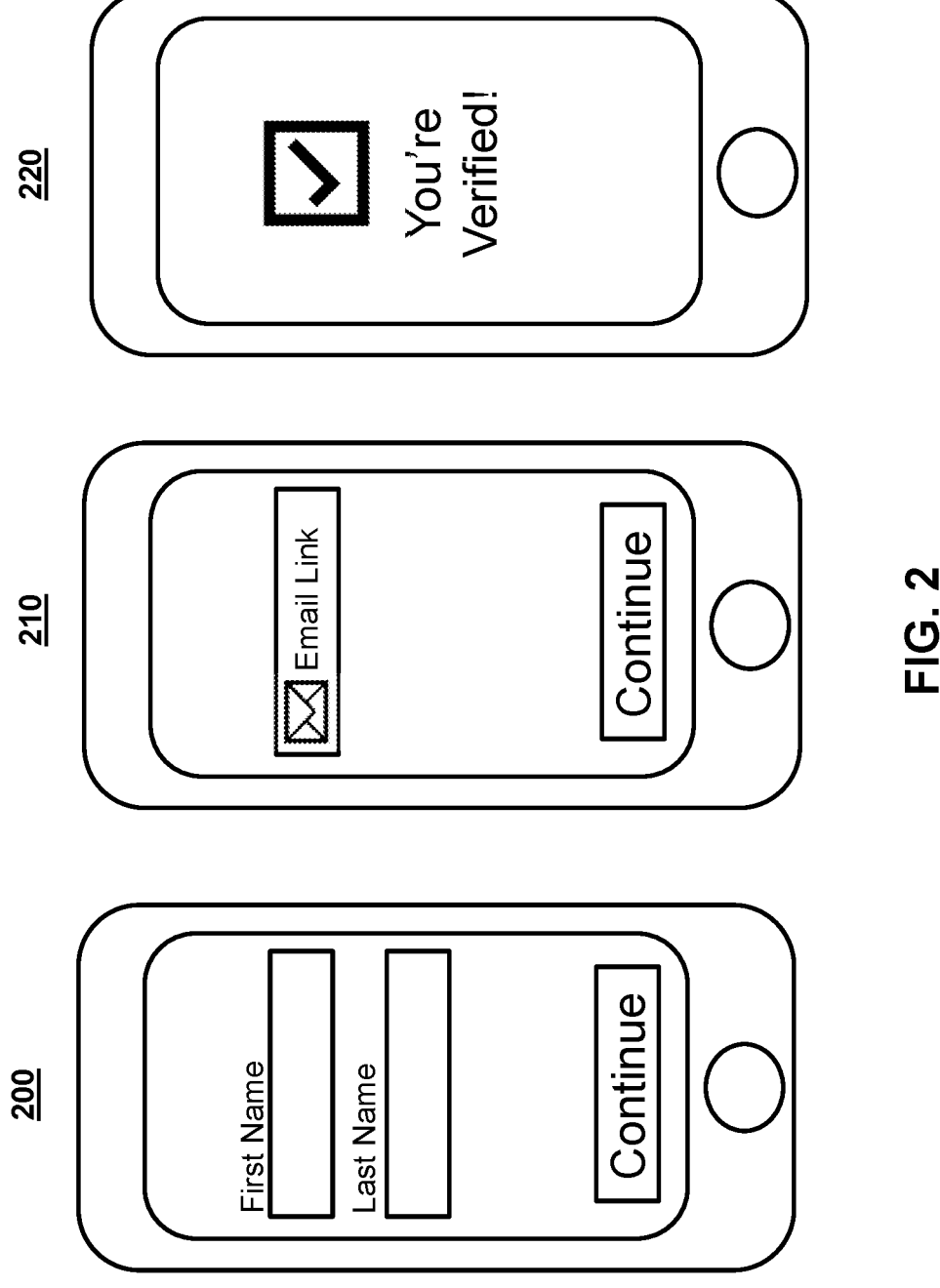
FIG. 2 shows an illustrative diagram for user interfaces facilitating independently sourced authentication, in accordance with one or more embodiments.

FIG. 2 shows an illustrative diagram for user interfaces facilitating independently sourced authentication, in accordance with one or more embodiments. FIG. 2 may represent a user establishing a device session using a user interface. In some embodiments, a user may be using a non-native account. For example, during guest checkout (e.g., and/or using a non-native account), user authorization is typically handled in a simplified manner compared to the authentication process associated with registered accounts. For example, when a user opts for guest checkout, the user may be asked to provide the minimum necessary information for the transaction. For example, user interface 200 may request user identifier information. User identifier information refers to data that uniquely identifies an individual user within a system or platform. This information is used to distinguish one user from another and is crucial for various purposes, such as user authentication, personalization, and activity tracking. This information may include a username (e.g., a name that uniquely identifies a user on a platform, often created during the registration process), an email address (e.g., a unique email address associated with a user's account, commonly used for communication, password recovery, and account verification) as shown in user interface 210, a User ID (e.g., a system-generated or assigned numerical or alphanumeric code that uniquely identifies a user, often used internally by the system for database management and tracking purposes), a phone number (e.g., a user's phone number that may serve as a unique identifier, especially for account recovery and two-factor authentication), biometric data (e.g., unique physical or behavioral characteristics, such as fingerprints, facial features, or voice patterns, which may be used as user identifiers for biometric authentication), an Internet protocol (IP) address (e.g., the IP address from which a user accesses a system, which can be used as a temporary identifier), device information (e.g., unique information associated with the device used by the user, such as device ID, MAC address, or IMEI number), etc.

For example, as shown in user interface 200, the system may request information that includes details such as the user's name, shipping address, and payment information. In non-native accounts, the user's authorization is primarily focused on a current transaction, communication, and/or other action taken during a current device session. The system may use any received information (e.g., payment information provided by the user) and verify that it is valid and matches the criteria set by the payment processor. Notably, to prevent man-in-the-middle attacks and to otherwise enhance security, the system may request information that is only verifiable through (e.g., only available to and/or accessible by) a third-party, independent authentication source.

In some embodiments, to enhance security, the non-native account authentication process (e.g., a guest checkout process) may implement additional measures such as CAPTCHA or other challenges to ensure that the transaction is not automated and is being initiated by a real person. In some embodiments (e.g., as shown in user interface 210), the system may send a confirmation email to the provided email address, containing details of the transaction and a confirmation link. Clicking on this link may serve as an additional step to verify the user's email and ensure the legitimacy of the transaction. For example, the system may only transmit the token in response to receiving a confirmation from the user's email.

In response to a verification by an independent authentication source, the system may verify the user during the first device session. Notably, to enhance security, the independent authentication source may generate a temporary session token that is assigned to the user during the authentication process. This token is used to maintain the user's context and authorize them for the duration of the session. Notably, the token may only be shared between the interface provider and the independent authentication source, in order to prevent a potential unauthorized user (e.g., a user currently impersonating an authorized user) from being able to perform any actions beyond a current transaction or communication, and/or outside the first device session. For example, the temporary session may be specific to the user, session, and/or non-native account. In some embodiments, the system may link the token to the user, session, and/or non-native account for future use. In such cases, the interface provider may generate a native account linked to the token.

To do so, the interface provider may facilitate the transmission of information from the user to the independent authentication source. The independent authentication source may use information (e.g., information only accessible to the independent authentication source) to authenticate the information provided by the user. The independent authentication source may then authenticate the user. By doing so, the interface provider has relied on information known to the other parties (e.g., the user and the independent authentication source) to authenticate the user.

Upon verification, a user may receive a notification that he/she has been authorized as shown in user interface 220. Notably, the user may not receive the token and/or information about the token (e.g., in order to enhance security).

Figure 3:
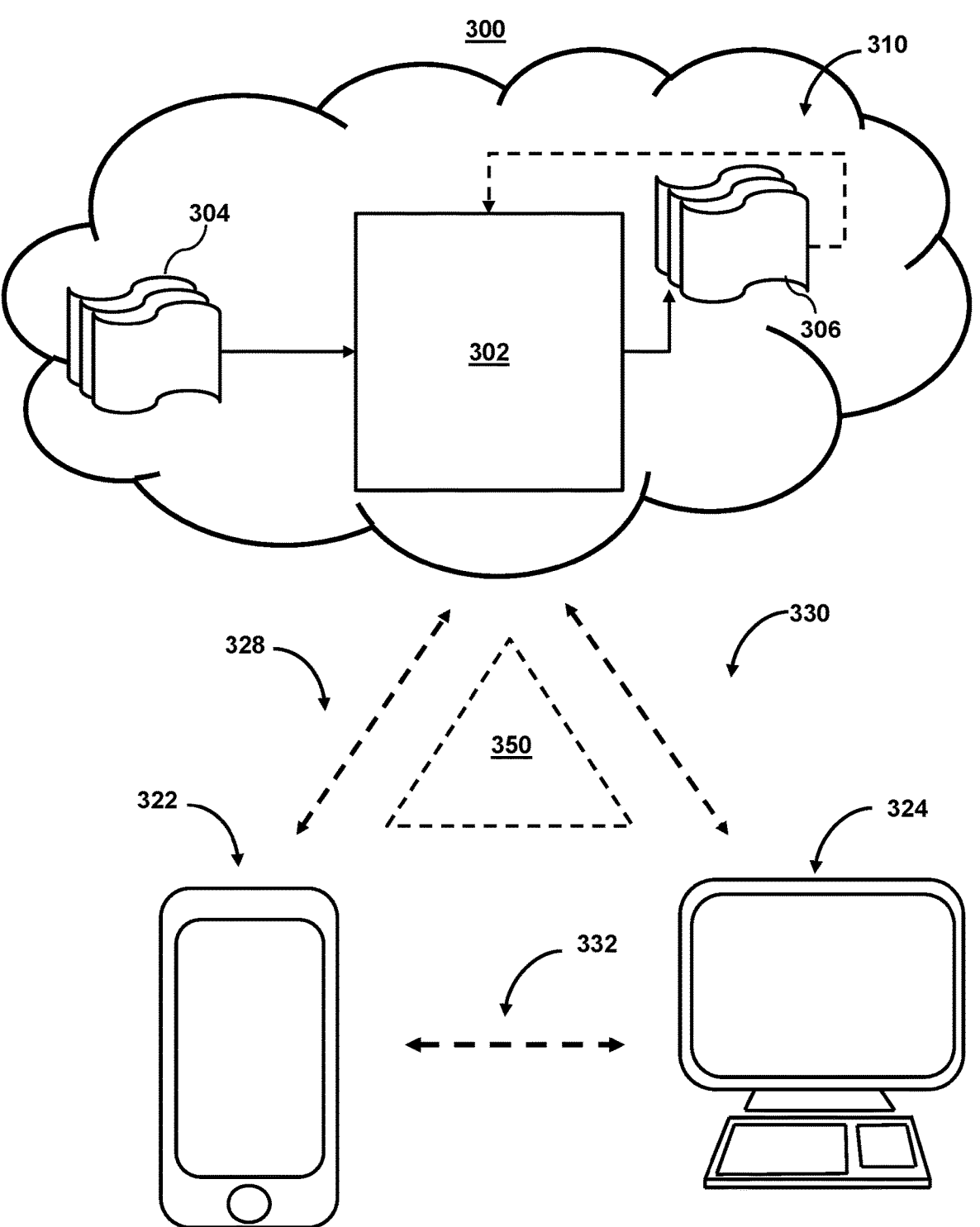
FIG. 3 shows illustrative components for a system used for independently sourced authentication, in accordance with one or more embodiments.

FIG. 3 shows illustrative components for a system used for independently sourced authentication, in accordance with one or more embodiments. For example, FIG. 3 shows illustrative components for a system used to authenticate a user, in accordance with one or more embodiments. In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming, and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results. These technical challenges may present an inherent problem with attempting to use an artificial intelligence-based solution in authenticating a user.

For example, FIG. 3 may show illustrative components for facilitating independently sourced authentication. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a unique token, user profile information, authentication information, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a unique token, user profile information, authentication information, etc.).

In some embodiments, the model (e.g., model 302) may automatically perform actions based on outputs 306. In some embodiments, the model (e.g., model 302) may not perform any actions. The output of the model (e.g., model 302) may be used to facilitate an independently sourced authentication.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

Figure 4:
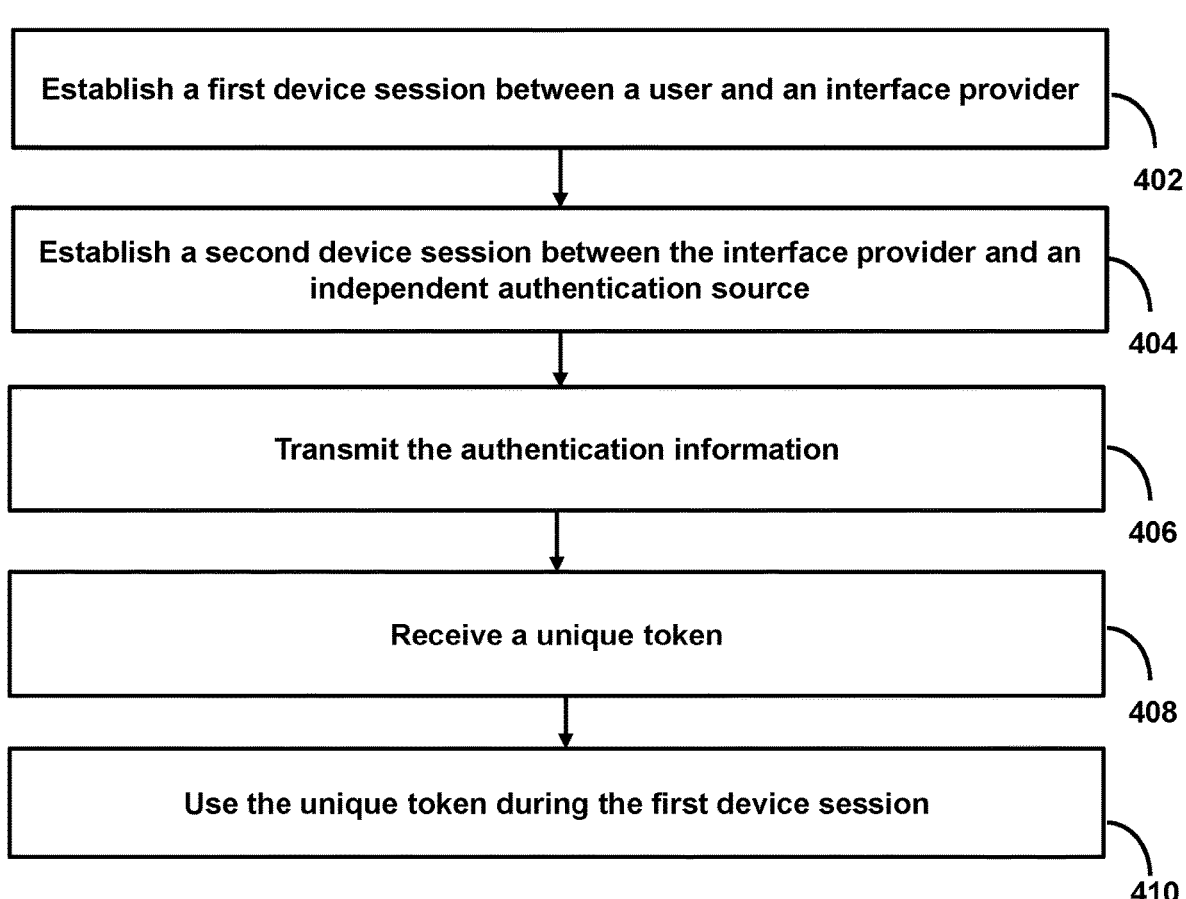
FIG. 4 shows a flowchart of the steps involved in providing independently sourced authentication during remote network sessions, in accordance with one or more embodiments.

FIG. 4 shows a flowchart of the steps involved in providing independently sourced authentication during remote network sessions, in accordance with one or more embodiments. For example, the system may use process 400 (e.g., as implemented on one or more system components described above) in order to authenticate a user using a bifurcated authentication process utilizing an independent authentication source.

At step 402, process 400 (e.g., using one or more components described above) establishes a first device session between a user and an interface provider. For example, the system may establish a first device session between a user and an interface provider using a non-native account.

In some embodiments, establishing the first device session between the user and the interface provider using the non-native account may comprise receiving one or more user inputs to a user interface. For example, the system (e.g., user interface 104 (FIG. 1A)) may generate for display a first option to invoke the first device session between the user and the interface provider using a native account, wherein the native account is facilitated by an interface provider. The system may generate for display, on the user interface, a second option to invoke the first device session between the user and the interface provider using the non-native account, wherein the non-native account is not facilitated by the interface provider. The system may then receive, via a user interface, a first user request, wherein the first user request establishes the first device session using the non-native account, wherein the first device session corresponds to a first session identifier. For example, the generation of options for different account types in a user interface involves designing and implementing a system that allows users to choose the type of account they want to create or manage. The process usually starts with a user registration or account creation page (or a decision to not register an account). This is where the user provides the necessary information to set up their account (or determines to use a non-native account).

At step 404, process 400 (e.g., using one or more components described above) establishes a second device session between the interface provider and an independent authentication source. For example, during the first device session, the system may perform one or more steps to establish a parallel device session.

For example, the system may query the user for authentication information. The system may receive the authentication information. For example, querying the user for authentication information may comprise the system generating for display, in a user interface, a plurality of independent authentication sources. The system may then receive a second user request, wherein the second user request selects the independent authentication source of the plurality of independent authentication sources. For example, the system may compile a list of independent authentication sources that users can choose from. These sources can include various authentication methods or providers, such as email verification, SMS codes, biometric authentication, hardware tokens, or third-party identity providers. The list of authentication sources is presented in a clear and user-friendly manner. This could be in the form of a dropdown menu, a set of radio buttons, checkboxes, or other interactive elements that allow users to make selections.

In some embodiments, querying the user for authentication information may comprise determining an authentication information type for the user that is available to the independent authentication source and determining authentication information based on the authentication information type. For example, the system may recognize the need for authentication and determine that an independent authentication source is required to verify the user's identity. The system identifies the authentication information type that is available and suitable for the independent authentication source. This could include factors such as the user's account settings, preferences, or the requirements of the specific transaction. Based on the identified authentication information type, the system prompts the user for the necessary authentication information. This could be in the form of a user interface element, such as a prompt, form, or dialog. The authentication information type could vary and might include a password (e.g., the user is prompted to enter a password associated with their account), a one-time code (e.g., the system generates or sends a one-time code to the user's registered email, phone, or authenticator app), biometric data (e.g., the user is prompted to provide biometric information, such as fingerprints, facial recognition, or voice), a token (e.g., the user enters a token generated by a hardware token or a mobile authentication app), and/or other information stored in a user profile of an independent authentication source.

In response to receiving the authentication information, the system may establish a second device session between the interface provider and an independent authentication source. In some embodiments, establishing the second device session between the interface provider and the independent authentication source may comprise determining a session run time for the second device session and comparing a current run time of the second device session to the session run time. For example, the need for a second device session arises, usually after the initial authentication session. This could be for additional authentication steps, multifactor authentication, or other security measures. The system determines a session run time for the second device session. The session run time is the predefined duration during which the second device session is considered valid. The session run time may be calculated based on various factors, including security policies, user preferences, or regulatory requirements. It represents the period during which the user is expected to complete the required authentication steps. The system communicates with the independent authentication source to establish the second device session.

This involves sending a request that includes information about the session run time. The independent authentication source generates a unique token or session ID for the second device session. This identifier is used to link the session between the interface provider and the authentication source. The system stores information about the session run time and associated session ID both on the interface provider's side and with the independent authentication source. This allows for synchronized tracking of the session's duration. The system monitors the current run time of the second device session in real time. This involves tracking the elapsed time from the session initiation. The system compares the current run time of the second device session with the predefined session run time. This comparison determines whether the session is still within the valid timeframe. If the current run time exceeds the session run time, the system initiates session expiration handling. This could involve notifying the user, terminating the session, or prompting for reauthentication, depending on the system's policies.

In some embodiments, establishing the second device session between the interface provider and the independent authentication source may comprise determining a participant identifier for the second device session and assigning the participant identifier to the independent authentication source. For example, the system identifies the need for a second device session, such as for additional authentication steps or multi-factor authentication. The system communicates with the independent authentication source to initiate the second device session. This communication includes the assignment of the participant identifier. The participant identifier may be generated based on various factors, such as a unique session ID, a cryptographic token, or other methods that ensure uniqueness and security. The assigned participant identifier is linked to the specific user or participant involved in the second device session. This linking ensures that the authentication source associates the identifier with the correct user. The participant identifier is securely transmitted between the interface provider and the independent authentication source. This may involve encryption or other secure communication protocols to protect the identifier during transmission. The system stores information about the participant identifier and the associated second device session context. This storage allows the system to maintain the state of the session and associate it with the correct user. The participant identifier is used to manage the secure session between the interface provider and the authentication source. This involves tracking the progress of the authentication process and ensuring the integrity of the session.

In some embodiments, establishing the second device session between the interface provider and the independent authentication source may comprise determining a first session identifier for the first device session and assigning a reference identifier for the second device session based on the first session identifier. The system retrieves or determines the first session identifier associated with the user's initial device session. This identifier uniquely represents the user's interaction with the interface provider during the first device session. Based on the first session identifier, the system assigns a reference identifier for the second device session. This reference identifier is used to link the second device session to the user's prior interaction. The system communicates with the independent authentication source to initiate the second device session, providing information about the reference identifier derived from the first device session. The reference identifier may be generated based on the first session identifier, ensuring a connection between the first and second device sessions. This could involve hashing, encoding, or other methods to create a secure and unique reference. The reference identifier is securely transmitted between the interface provider and the independent authentication source. Encryption or secure communication protocols may be employed to protect the identifier during transmission. The system stores information about the reference identifier and the associated second device session context. This storage allows the system to maintain the relationship between the first and second device sessions. The independent authentication source validates the reference identifier received from the interface provider, ensuring that it corresponds to an active and valid second device session linked to the user's prior interaction. The reference identifier is used to manage the secure session between the interface provider and the authentication source. This involves tracking the progress of the authentication process and ensuring the integrity of the session.

In some embodiments, establishing the second device session between the interface provider and the independent authentication source may comprise determining a first user identifier for the user and assigning a second user identifier for the second device session based on the first user identifier. The system retrieves or determines the first user identifier associated with the user's initial device session. This identifier uniquely represents the user. Based on the first user identifier, the system assigns a second user identifier for the second device session. This second user identifier is used to distinguish the user's interaction during the second device session. The system communicates with the independent authentication source to initiate the second device session, providing information about the second user identifier derived from the first user identifier. The second user identifier may be generated based on the first user identifier, ensuring a connection between the first and second device sessions. This could involve hashing, encoding, or other methods to create a secure and unique identifier. The second user identifier is securely transmitted between the interface provider and the independent authentication source. Encryption or secure communication protocols may be employed to protect the identifier during transmission. The system stores information about the second user identifier and the associated second device session context. This storage allows the system to maintain the relationship between the first and second device sessions. The independent authentication source validates the second user identifier received from the interface provider, ensuring that it corresponds to an active and valid second device session linked to the user's first identifier. The second user identifier is used to manage the secure session between the interface provider and the authentication source. This involves tracking the progress of the authentication process and ensuring the integrity of the session.

At step 406, process 400 (e.g., using one or more components described above) transmits the authentication information. For example, using the second device session, the system may transmit the authentication information to the independent authentication source. The system may transmit authentication information using various methods and protocols. The specific approach depends on the context, security requirements, and technology stack involved. The system may transmit authentication information over HTTPS. HTTPS encrypts the communication between the user's device and the server using SSL/TLS protocols, ensuring that sensitive information, including authentication credentials, is protected during transit.

At step 408, process 400 (e.g., using one or more components described above) receives a unique token. For example, the system may receive a unique token, from the independent authentication source, based on a user authentication of the user by the independent authentication source using the authentication information. For example, token-based authentication involves the use of tokens (e.g., JWTs) to transmit authentication information. Upon successful authentication, a server may issue a token to the interface provider, which is then included in the headers of subsequent requests.

At step 410, process 400 (e.g., using one or more components described above) uses the unique token during the first device session. For example, the system may use the unique token to populate a communication between the user and the interface provider during the first device session.

In some embodiments, using the unique token to populate the communication between the user and the interface provider during the first device session may comprise determining private information corresponding to the user required for the communication and populating the private information using the unique token. The system may generate a unique token (e.g., via the second device session) when the user initiates the first device session. This token serves as a secure and random identifier associated with the user and the ongoing session. The unique token is linked to private information corresponding to the user. This private information could include user preferences, account details, or any other relevant information required for communication. During the first device session, the system determines the specific private information that is necessary for communication with the user. This determination is based on the context of the interaction, the user's preferences, or the requirements of the service. The system may use the unique token to securely retrieve the linked private information associated with the user. The token acts as a key to access the user-specific data stored securely on the server.

In some embodiments, using the unique token to populate the communication between the user and the interface provider during the first device session may comprise determining a first user identifier corresponding to the first device session, determining a second user identifier corresponding to the unique token, and matching the first user identifier to the second user identifier. During the first device session, the system determines the specific private information that is necessary for communication with the user. This determination is based on the context of the interaction, the user's preferences, or the requirements of the service. The system uses the unique token to securely retrieve the linked private information associated with the user. The token acts as a key to access the user-specific data stored securely on the server. The system matches the first user identifier (session identifier) to the second user identifier (token identifier) to ensure that the unique token corresponds to the ongoing first device session. This matching process establishes a secure link between the user and their private information.

In some embodiments, using the unique token to populate the communication between the user and the interface provider during the first device session may comprise the system determining a first session identifier corresponding to the first device session, determining a second session identifier corresponding to the unique token, and matching the first session identifier to the second session identifier. For example, the system links the unique token to two session identifiers. The first session identifier corresponds to the first device session and is associated with the user's interaction during the session. The second session identifier (token identifier) corresponds to the unique token and is used to retrieve session-specific data. During the first device session, the system determines the specific private information that is necessary for communication with the user. This determination is based on the context of the interaction, the user's preferences, or the requirements of the service. The system uses the unique token to securely retrieve the linked private information associated with the user's ongoing session. The token acts as a key to access the session-specific data stored securely on the server. The system matches the first session identifier to the second session identifier (token identifier) to ensure that the unique token corresponds to the ongoing first device session. This matching process establishes a secure link between the user's session and their private information.

In some embodiments, using the unique token to populate the communication between the user and the interface provider during the first device session comprises the system determining a session run time for the second device session and comparing a current run time of the second device session to the session run time. For example, the system determines a session run time for the second device session. This session run time represents the predefined duration during which the second device session is considered valid. The system stores information about the unique token and associated session run time securely. This includes details about the user, the session, and any other relevant context needed for communication. The system communicates with an independent authentication source to initiate the second device session, providing information about the unique token and session run time. The independent authentication source validates the unique token to ensure its authenticity and matches it with the associated session information. This step enhances the security of the session. The system calculates the session run time based on the current time and the predefined duration set for the second device session. This calculation helps in monitoring the elapsed time during the session. The system compares the current run time of the second device session to the predefined session run time. This comparison determines whether the session is still within the valid timeframe. If the current run time exceeds the session run time, the system initiates session expiration handling. This could involve notifying the user, terminating the session, or prompting for reauthentication, depending on the system's policies.

In some embodiments, using the unique token to populate the communication between the user and the interface provider during the first device session may comprise the system determining a token expiration time for the unique token and comparing a current time to the token expiration time. The system generates a unique token when the user initiates the first device session. This token is linked to the user's session information and includes details about the token expiration time. The system determines a token expiration time for the unique token. This expiration time represents the point in time when the token will no longer be considered valid for authentication or communication. The system stores information about the unique token, including the token expiration time and associated session information. This information is securely stored and used to validate the token during the session. The system communicates with an independent authentication source to initiate and validate the token for the ongoing session. The independent authentication source validates the unique token, ensuring its authenticity and checking that it has not expired. This step enhances the security of the session. The system continuously monitors the current time in real time and compares it to the token expiration time. This comparison determines whether the token is still valid based on the specified expiration time. If the current time exceeds the token expiration time, the system initiates token expiration handling. This could involve notifying the user, terminating the session, or prompting for reauthentication, depending on the system's policies.

In some embodiments, the system may link a non-native account to a token to create a token-based native account. For example, using the unique token to populate the communication between the user and the interface provider during the first device session may comprise the system generating a native account for the user with the interface provider and storing the unique token in the native account. The system may create a native account for the user with the interface provider. This account is associated with the token. As part of the account creation process, the system generates a unique token. This token is linked to the user's native account and serves as a secure identifier for communication and authentication purposes. The unique token is securely stored within the user's native account. This ensures that the token is associated with the user's profile and can be retrieved when needed for subsequent sessions. When the user initiates the first device session, the system retrieves the unique token from the user's native account. This token is then used to initialize secure communication between the user and the interface provider. The system initiates secure communication with the user, utilizing the unique token retrieved from the native account. This communication may include personalized messages, notifications, or customized content based on the user's profile and preferences. Depending on security measures and session policies, the system may allow for token renewal to extend the validity period.

This helps maintain continuous and secure communication with the user across multiple sessions.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
FIG. 5 shows a flowchart of the steps involved in preventing man-in-the-middle cyberattacks using independently sourced authentication during remote network sessions, in accordance with one or more embodiments.

FIG. 5 shows a flowchart of the steps involved in preventing man-in-the-middle cyberattacks using independently sourced authentication during remote network sessions, in accordance with one or more embodiments. For example, the system may use process 500 (e.g., as implemented on one or more system components described above) in order to authenticate a user using a bifurcated authentication process utilizing an independent authentication source.

At step 502, process 500 (e.g., using one or more components described above) receives an authentication request from an interface provider. For example, the system may receive, by an independent authentication source, an authentication request from an interface provider, wherein the authentication request requests authentication of a user with the interface provider during a first device session between the interface provider and the user. For example, the interface provider may initiate an authentication request on behalf of the user. This request may be sent to the system (e.g., the independent authentication source) that needs to verify the user's identity. For example, the interface provider may interact with the user during the first device session. This interaction could involve the user attempting to access certain resources, perform specific actions, or engage in transactions that require authentication. For example, a user may initiate a session on a device to access a system, application, or service that requires authentication. This is the first device session.

In some embodiments, establishing the first device session between the user and the interface provider using a non-native account may comprise receiving one or more user inputs to a user interface. For example, the system (e.g., user interface 104 (FIG. 1A)) may generate for display a first option to invoke the first device session between the user and the interface provider using a native account, wherein the native account is facilitated by an interface provider. The system may generate for display, on the user interface, a second option to invoke the first device session between the user and the interface provider using the non-native account, wherein the non-native account is not facilitated by the interface provider. The system may then receive, via a user interface, a first user request, wherein the first user request establishes the first device session using the non-native account, wherein the first device session corresponds to a first session identifier. For example, the generation of options for different account types in a user interface involves designing and implementing a system that allows users to choose the type of account they want to create or manage. The process usually starts with a user registration or account creation page (or a decision to not register an account). This is where the user provides the necessary information to set up their account (or determines to use a non-native account).

In some embodiments, establishing the second device session between the interface provider and the independent authentication source may comprise determining a session run time for the second device session and comparing a current run time of the second device session to the session run time. For example, the need for a second device session arises, usually after the initial authentication session. This could be for additional authentication steps, multi-factor authentication, or other security measures. The system determines a session run time for the second device session. The session run time is the predefined duration during which the second device session is considered valid. The session run time may be calculated based on various factors, including security policies, user preferences, or regulatory requirements. It represents the period during which the user is expected to complete the required authentication steps. The system communicates with the independent authentication source to establish the second device session. This involves sending a request that includes information about the session run time. The independent authentication source generates a unique token or session ID for the second device session. This identifier is used to link the session between the interface provider and the authentication source. The system stores information about the session run time and associated session ID both on the interface provider's side and with the independent authentication source. This allows for synchronized tracking of the session's duration. The system monitors the current run time of the second device session in real time. This involves tracking the elapsed time from the session initiation. The system compares the current run time of the second device session with the predefined session run time. This comparison determines whether the session is still within the valid timeframe. If the current run time exceeds the session run time, the system initiates session expiration handling. This could involve notifying the user, terminating the session, or prompting for reauthentication, depending on the system's policies.

In some embodiments, establishing the second device session between the interface provider and the independent authentication source may comprise determining a participant identifier for the second device session and assigning the participant identifier to the independent authentication source. For example, the system identifies the need for a second device session, such as for additional authentication steps or multi-factor authentication. The system communicates with the independent authentication source to initiate the second device session. This communication includes the assignment of the participant identifier. The participant identifier may be generated based on various factors, such as a unique session ID, a cryptographic token, or other methods that ensure uniqueness and security. The assigned participant identifier is linked to the specific user or participant involved in the second device session. This linking ensures that the authentication source associates the identifier with the correct user. The participant identifier is securely transmitted between the interface provider and the independent authentication source. This may involve encryption or other secure communication protocols to protect the identifier during transmission. The system stores information about the participant identifier and the associated second device session context. This storage allows the system to maintain the state of the session and associate it with the correct user. The participant identifier is used to manage the secure session between the interface provider and the authentication source. This involves tracking the progress of the authentication process and ensuring the integrity of the session.

In some embodiments, establishing the second device session between the interface provider and the independent authentication source may comprise determining a first session identifier for the first device session and assigning a reference identifier for the second device session based on the first session identifier. The system retrieves or determines the first session identifier associated with the user's initial device session. This identifier uniquely represents the user's interaction with the interface provider during the first device session. Based on the first session identifier, the system assigns a reference identifier for the second device session. This reference identifier is used to link the second device session to the user's prior interaction. The system communicates with the independent authentication source to initiate the second device session, providing information about the reference identifier derived from the first device session. The reference identifier may be generated based on the first session identifier, ensuring a connection between the first and second device sessions. This could involve hashing, encoding, or other methods to create a secure and unique reference. The reference identifier is securely transmitted between the interface provider and the independent authentication source. Encryption or secure communication protocols may be employed to protect the identifier during transmission. The system stores information about the reference identifier and the associated second device session context. This storage allows the system to maintain the relationship between the first and second device sessions. The independent authentication source validates the reference identifier received from the interface provider, ensuring that it corresponds to an active and valid second device session linked to the user's prior interaction. The reference identifier is used to manage the secure session between the interface provider and the authentication source. This involves tracking the progress of the authentication process and ensuring the integrity of the session.

In some embodiments, establishing the second device session between the interface provider and the independent authentication source may comprise determining a first user identifier for the user and assigning a second user identifier for the second device session based on the first user identifier. The system retrieves or determines the first user identifier associated with the user's initial device session. This identifier uniquely represents the user. Based on the first user identifier, the system assigns a second user identifier for the second device session. This second user identifier is used to distinguish the user's interaction during the second device session. The system communicates with the independent authentication source to initiate the second device session, providing information about the second user identifier derived from the first user identifier. The second user identifier may be generated based on the first user identifier, ensuring a connection between the first and second device sessions. This could involve hashing, encoding, or other methods to create a secure and unique identifier. The second user identifier is securely transmitted between the interface provider and the independent authentication source. Encryption or secure communication protocols may be employed to protect the identifier during transmission. The system stores information about the second user identifier and the associated second device session context. This storage allows the system to maintain the relationship between the first and second device sessions. The independent authentication source validates the second user identifier received from the interface provider, ensuring that it corresponds to an active and valid second device session linked to the user's first identifier. The second user identifier is used to manage the secure session between the interface provider and the authentication source. This involves tracking the progress of the authentication process and ensuring the integrity of the session.

At step 504, process 500 (e.g., using one or more components described above) retrieves authentication information. For example, the system may retrieve, by the independent authentication source, authentication information from the authentication request. The system, upon receiving the authentication request from the interface provider, forwards the request to or communicates with an independent authentication source. This source could be a third-party authentication service, a financial services provider, a centralized authentication server, or another trusted entity responsible for verifying user identities. For example, the system recognizes the need for user authentication and initiates a request to an independent authentication source. This source is a separate entity responsible for verifying user identities. The system may launch a parallel device session with the independent authentication source. This parallel session is established to securely communicate and exchange information related to user authentication. The user is prompted to interact with the interface provider (e.g., to obtain the authentication information). This interaction may involve providing authentication credentials (e.g., username and password), engaging in multi-factor authentication, and/or providing biometric data.

In some embodiments, retrieving the authentication information from the authentication request comprises the system establishing a second device session between the independent authentication source and the interface provider, wherein the second device session is terminated after transmitting the unique token to the interface provider. For example, the system may establish a parallel device session.

At step 506, process 500 (e.g., using one or more components described above) retrieves user profile information. For example, the system may retrieve, by the independent authentication source, user profile information for the user. For example, the independent authentication source may initiate the user authentication process. This may involve requesting the user to provide authentication credentials (e.g., username and password) using multi-factor authentication methods and/or interacting with biometric data.

At step 508, process 500 (e.g., using one or more components described above) authenticates the user for a device session. For example, the system may authenticate the user for the first device session by comparing the authentication information to the user profile information. For example, the independent authentication source verifies the user's identity based on the provided credentials or other authentication factors. This verification is crucial to ensure that the user attempting the action through the interface provider is legitimate. For example, the independent authentication source verifies the user's identity based on the provided credentials or other authentication factors. This verification process may be conducted separately from the initial device session.

At step 510, process 500 (e.g., using one or more components described above) generates a unique token. For example, the system may, in response to authenticating the user, generate a unique token for the first device session. For example, the independent authentication source may generate an authentication response indicating the success or failure of the authentication process. This response is sent back to the system that initially sent the authentication request (e.g., the interface provider). The response may comprise the unique token. For example, upon successful verification, the independent authentication source generates an authentication response indicating that the user's identity has been verified. This response is sent back to the system that initiated the authentication request along with the unique token. In some embodiments, the unique token is used by the system to populate a communication between the user and the interface provider during the first device session.

In some embodiments, generating the unique token for the first device session may comprise the system determining private information corresponding to the user required for the communication and populating the private information using the unique token. The system may generate a unique token (e.g., via the second device session) when the user initiates the first device session. This token serves as a secure and random identifier associated with the user and the ongoing session. The unique token is linked to private information corresponding to the user. This private information could include user preferences, account details, or any other relevant information required for communication. During the first device session, the system determines the specific private information that is necessary for communication with the user. This determination is based on the context of the interaction, the user's preferences, or the requirements of the service. The system may use the unique token to securely retrieve the linked private information associated with the user. The token acts as a key to access the user-specific data stored securely on the server.

In some embodiments, generating the unique token for the first device session may comprise the system determining a first user identifier corresponding to the first device session, determining a second user identifier corresponding to the unique token, and matching the first user identifier to the second user identifier. During the first device session, the system determines the specific private information that is necessary for communication with the user. This determination is based on the context of the interaction, the user's preferences, or the requirements of the service. The system uses the unique token to securely retrieve the linked private information associated with the user. The token acts as a key to access the user-specific data stored securely on the server. The system matches the first user identifier (session identifier) to the second user identifier (token identifier) to ensure that the unique token corresponds to the ongoing first device session. This matching process establishes a secure link between the user and their private information.

In some embodiments, generating the unique token for the first device session may comprise the system determining a first session identifier corresponding to the first device session, determining a second session identifier corresponding to the unique token, and matching the first session identifier to the second session identifier. For example, the system links the unique token to two session identifiers. The first session identifier corresponds to the first device session and is associated with the user's interaction during the session. The second session identifier (token identifier) corresponds to the unique token and is used to retrieve session-specific data. During the first device session, the system determines the specific private information that is necessary for communication with the user. This determination is based on the context of the interaction, the user's preferences, or the requirements of the service. The system uses the unique token to securely retrieve the linked private information associated with the user's ongoing session. The token acts as a key to access the session-specific data stored securely on the server. The system matches the first session identifier to the second session identifier (token identifier) to ensure that the unique token corresponds to the ongoing first device session. This matching process establishes a secure link between the user's session and their private information.

In some embodiments, generating the unique token for the first device session comprises the system determining a session run time for the second device session and comparing a current run time of the second device session to the session run time. For example, the system determines a session run time for the second device session. This session run time represents the predefined duration during which the second device session is considered valid. The system stores information about the unique token and associated session run time securely. This includes details about the user, the session, and any other relevant context needed for communication. The system communicates with an independent authentication source to initiate the second device session, providing information about the unique token and session run time. The independent authentication source validates the unique token to ensure its authenticity and matches it with the associated session information. This step enhances the security of the session. The system calculates the session run time based on the current time and the predefined duration set for the second device session. This calculation helps in monitoring the elapsed time during the session. The system compares the current run time of the second device session to the predefined session run time. This comparison determines whether the session is still within the valid timeframe. If the current run time exceeds the session run time, the system initiates session expiration handling. This could involve notifying the user, terminating the session, or prompting for reauthentication, depending on the system's policies.

In some embodiments, generating the unique token for the first device session may comprise the system determining a token expiration time for the unique token and comparing a current time to the token expiration time. The system generates a unique token when the user initiates the first device session. This token is linked to the user's session information and includes details about the token expiration time. The system determines a token expiration time for the unique token. This expiration time represents the point in time when the token will no longer be considered valid for authentication or communication. The system stores information about the unique token, including the token expiration time and associated session information. This information is securely stored and used to validate the token during the session. The system communicates with an independent authentication source to initiate and validate the token for the ongoing session. The independent authentication source validates the unique token, ensuring its authenticity and checking that it has not expired. This step enhances the security of the session. The system continuously monitors the current time in real time and compares it to the token expiration time. This comparison determines whether the token is still valid based on the specified expiration time. If the current time exceeds the token expiration time, the system initiates token expiration handling. This could involve notifying the user, terminating the session, or prompting for reauthentication, depending on the system's policies.

At step 512, process 500 (e.g., using one or more components described above) transmits the unique token to the interface provider. For example, the system may transmit the unique token to the interface provider. Based on the authentication response (and the receipt of the token), the system (e.g., the interface provider) makes a decision regarding access. If authentication is successful, access is granted to the user through the interface provider's session. If authentication fails, access is denied, and appropriate measures may be taken (e.g., notifying the user or triggering additional security steps). If access is granted, the user can continue interacting with the interface provider during the first device session, performing the intended actions securely. For example, the system receives the authentication response and makes a decision regarding access. If the user's identity is successfully verified, access is granted to the first device session using the unique token. If authentication fails, access is denied, and appropriate measures may be taken.

For example, if access is granted, the user can continue interacting with the system during the first device session, performing the intended actions securely. The unique token may represent data provided by a financial services provider that may be used to perform transactions and/or other communications. For example, the token may be used as a substitute for credit card information to enhance security and protect sensitive financial data. The process involves replacing the actual credit card details with a token, which is a randomly generated and unique identifier. When a user initiates an online transaction, the payment system or merchant sends a request to tokenize the credit card information. The user's credit card information, including the card number, expiration date, and security code (CVV), is encrypted to ensure secure transmission. The encrypted credit card data is sent to a tokenization service, often provided by a payment gateway or a token service provider. This service generates a unique token, which is a randomized string of characters. The token, rather than the actual credit card details, is stored by the merchant (e.g., the interface provider) or payment service provider. This means that even if the merchant's systems are compromised, the attacker would only gain access to tokens rather than sensitive credit card information. The token, instead of the credit card information, is transmitted between the merchant, payment gateway, and other entities involved in the payment process. This token serves as a reference to the user's credit card information. The token may be used in the transaction process to authorize and complete the payment. It is sent to the payment processor, which retrieves the corresponding credit card information associated with the token from its secure storage. The payment processor decrypts the token to obtain the actual credit card details for authorization and settlement purposes. The payment processor verifies the credit card details, checks for available funds, and communicates with the issuing bank to obtain transaction approval. Upon approval, the payment processor sends a confirmation to the merchant, and the transaction is completed. Importantly, the merchant never stores the actual credit card information, reducing the risk of data breaches. Tokenization significantly improves security in online transactions by reducing the exposure of sensitive credit card information. Even if an attacker gains access to the tokens, they are useless without the corresponding decryption key held by the payment processor. This method helps protect users and merchants from the risks associated with storing and transmitting actual credit card details.

In some embodiments, transmitting the unique token to the interface provider may comprise the system transmitting an authentication response to the interface provider, wherein the authentication response confirms an identity of the user, and terminating a second device session between the independent authentication source and the interface provider after transmitting the unique token to the interface provider. For example, upon successful authentication, the independent authentication source generates an authentication response. This response includes a confirmation of the user's identity and may also include the unique token associated with the user's session. The system transmits the authentication response, including the unique token, to the interface provider. This transmission is typically done through a secure channel, such as HTTPS, to protect the confidentiality and integrity of the authentication information. After successfully transmitting the unique token to the interface provider and confirming the user's identity, the second device session between the independent authentication source and the interface provider is terminated. This helps secure the communication channel between them and may be done for security and resource management reasons. The interface provider uses the received unique token to establish and maintain a secure and personalized session with the user. The token serves as a key to access user-specific data and facilitate secure communication during the first device session with the interface provider. Using the unique token, the interface provider initializes secure communication with the user. This communication may include personalized messages, notifications, or customized content based on the user's profile and preferences. The user interacts with the interface provider during the first device session, performing various activities that require authentication, access to personalized information, or secure transactions.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing independently sourced authentication during remote network sessions and/or preventing man-in-the-middle cyberattacks using independently sourced authentication during remote network sessions.

2. The method of the preceding embodiment, further comprising: receiving, by an independent authentication source, an authentication request from an interface provider, wherein the authentication request requests authentication of a user with the interface provider during a first device session between the interface provider and the user; retrieving, by the independent authentication source, authentication information from the authentication request; retrieving, by the independent authentication source, user profile information for the user; authenticating the user for the first device session by comparing the authentication information to the user profile information; in response to authenticating the user, generating a unique token for the first device session; and transmitting the unique token to the interface provider.

3. The method of any one of the preceding embodiments, wherein retrieving the authentication information from the authentication request further comprises establishing a second device session between the independent authentication source and the interface provider, wherein the second device session is terminated after transmitting the unique token to the interface provider.

4. The method of any one of the preceding embodiments, wherein establishing the second device session between the interface provider and the independent authentication source further comprises: determining a session run time for the second device session; and comparing a current run time of the second device session to the session run time.

5. The method of any one of the preceding embodiments, wherein establishing the second device session between the interface provider and the independent authentication source further comprises: determining a participant identifier for the second device session; and assigning the participant identifier to the independent authentication source.

6. The method of any one of the preceding embodiments, wherein establishing the second device session between the interface provider and the independent authentication source further comprises: determining a first session identifier for the first device session; and assigning a reference identifier for the second device session based on the first session identifier.

7. The method of any one of the preceding embodiments, wherein establishing the second device session between the interface provider and the independent authentication source further comprises: determining a first user identifier for the user; and assigning a second user identifier for the second device session based on the first user identifier.

8. The method of any one of the preceding embodiments, wherein generating the unique token for the first device session further comprises: determining a first user identifier corresponding to the user in the first device session; and determining the unique token based on the first user identifier.

9. The method of any one of the preceding embodiments, wherein generating the unique token for the first device session further comprises: determining a session run time for the first device session; and determining a token expiration time for the unique token based on the session run time.

10. The method of any one of the preceding embodiments, wherein generating the unique token for the first device session further comprises: determining a first session identifier corresponding to the first device session; and determining the unique token based on the first session identifier.

11. The method of any one of the preceding embodiments, wherein generating the unique token for the first device session further comprises: determining a communication identifier corresponding to the first device session; and determining the unique token based on the communication identifier.

12. The method of any one of the preceding embodiments, wherein generating the unique token for the first device session further comprises: determining private information corresponding to the user; and determining the unique token based on the private information.

13. The method of any one of the preceding embodiments, wherein the unique token is used to populate a communication between the user and the interface provider during the first device session.

14. The method of any one of the preceding embodiments, wherein transmitting the unique token to the interface provider further comprises: transmitting an authentication response to the interface provider, wherein the authentication response confirms an identity of the user; and terminating a second device session between the independent authentication source and the interface provider after transmitting the unique token to the interface provider.

15. The method of any one of the preceding embodiments, further comprising: establishing a first device session between a user and an interface provider using a non-native account; during the first device session: querying the user for authentication information; receiving the authentication information; in response to receiving the authentication information, establishing a second device session between the interface provider and an independent authentication source; using the second device session: transmitting the authentication information to the independent authentication source; receiving a unique token, from the independent authentication source, based on a user authentication of the user by the independent authentication source using the authentication information; and using the unique token to populate a communication between the user and the interface provider during the first device session.

16. The method of any one of the preceding embodiments, wherein establishing the first device session between the user and the interface provider using the non-native account further comprises: generating for display, on a user interface, a first option to invoke the first device session between the user and the interface provider using a native account, wherein the native account is facilitated by an interface provider; generating for display, on the user interface, a second option to invoke the first device session between the user and the interface provider using the non-native account, wherein the non-native account is not facilitated by the interface provider; and receiving, via a user interface, a first user request, wherein the first user request establishes the first device session using the non-native account, wherein the first device session corresponds to a first session identifier.

17. The method of any one of the preceding embodiments, wherein querying the user for authentication information further comprises: generating for display, in a user interface, a plurality of independent authentication sources; and receiving a second user request, wherein the second user request selects an independent authentication source of the plurality of independent authentication sources.

18. The method of any one of the preceding embodiments, wherein querying the user for authentication information further comprises: determining an authentication information type for the user that is available to the independent authentication source; and determining authentication information based on the authentication information type.

19. The method of any one of the preceding embodiments, wherein establishing the second device session between the interface provider and the independent authentication source further comprises: determining a session run time for the second device session; and comparing a current run time of the second device session to the session run time.

20. The method of any one of the preceding embodiments, wherein establishing the second device session between the interface provider and the independent authentication source further comprises: determining a participant identifier for the second device session; and assigning the participant identifier to the independent authentication source.

21. The method of any one of the preceding embodiments, wherein establishing the second device session between the interface provider and the independent authentication source further comprises: determining a first session identifier for the first device session; and assigning a reference identifier for the second device session based on the first session identifier.

22. The method of any one of the preceding embodiments, wherein establishing the second device session between the interface provider and the independent authentication source further comprises: determining a first user identifier for the user; and assigning a second user identifier for the second device session based on the first user identifier.

23. The method of any one of the preceding embodiments, wherein using the unique token to populate the communication between the user and the interface provider during the first device session further comprises: determining private information corresponding to the user required for the communication; and populating the private information using the unique token.

24. The method of any one of the preceding embodiments, wherein using the unique token to populate the communication between the user and the interface provider during the first device session further comprises: determining a first user identifier corresponding to the first device session; determining a second user identifier corresponding to the unique token; and matching the first user identifier to the second user identifier.

25. The method of any one of the preceding embodiments, wherein using the unique token to populate the communication between the user and the interface provider during the first device session further comprises: determining a first session identifier corresponding to the first device session; determining a second session identifier corresponding to the unique token; and matching the first session identifier to the second session identifier.

26. The method of any one of the preceding embodiments, wherein using the unique token to populate the communication between the user and the interface provider during the first device session further comprises: determining a session run time for the second device session; and comparing a current run time of the second device session to the session run time.

27. The method of any one of the preceding embodiments, wherein using the unique token to populate the communication between the user and the interface provider during the first device session further comprises: determining a token expiration time for the unique token; and comparing a current time to the token expiration time.

28. The method of any one of the preceding embodiments, wherein using the unique token to populate the communication between the user and the interface provider during the first device session further comprises: generating a native account for the user with the interface provider; and storing the unique token in the native account.

29. One or more non-transitory, computer-readable mediums storing instructions that, when executed by a data processing apparatus, cause the data processing apparatus to perform operations comprising those of any of embodiments 1-28.

30. A system comprising one or more processors; and memory storing instructions that, when executed by the processors, cause the processors to effectuate operations comprising those of any of embodiments 1-28.

31. A system comprising means for performing any of embodiments 1-28.

What is claimed is:

1. A system for providing independently sourced authentication during remote network sessions featuring non-native accounts, the system comprising:

one or more processors and one or more non-transitory media comprising instructions recorded thereon that, when executed by the one or more processors, cause operations comprising:

generating for display, on a user interface, (i) a first user-selectable option to invoke a first device session between a user and an interface provider using a native account and (ii) a second user-selectable option to invoke the first device session between the user and the interface provider using a non-native account, wherein the native account is facilitated by the interface provider, and wherein the non-native account is facilitated by at least one independent authentication source independent of the interface provider and not facilitated by the interface provider;

in response to the second user-selectable option being selected via a user request associated with the user, establishing the first device session between the user and the interface provider using the non-native account;

in response to receiving authentication information associated with the non-native account via the first device session between the user and the interface provider, transmitting, via a second device session between the interface provider and an independent authentication source, the authentication information from the interface provider to the independent authentication source;

in response to (i) transmitting the authentication information to the independent authentication source via the second device session between the interface provider and the independent authentication source and (ii) the independent authentication source authenticating the user using the authentication information, receiving, via the second device session, from the independent authentication source, a unique temporary session token that is not provided to a user device of the user; and using the unique temporary session token from the independent authentication source to populate a communication between the user and the interface provider during the first device session with substitute payment information corresponding to payment information associated with the user in lieu of the payment information, wherein using the unique temporary session token comprises matching a first identifier corresponding to the first device session to a second identifier corresponding to the unique temporary session token.

2. A method comprising:

performing, by one or more processors of an interface provider system, operations comprising:

establishing a first device session between a user and an interface provider associated with the interface provider system using a non-native account and querying the user for authentication information via the first device session;

based on querying the user for the authentication information via the first device session between the user and the interface provider, receiving the authentication information via the first device session;

based on receiving the authentication information via the first device session between the user and the interface provider, transmitting, via a second device session between the interface provider and an independent authentication source, the authentication information to the independent authentication source;

receiving, via the second device session, from the independent authentication source, a unique temporary session token that is not provided to a user device of the user in the first device session; and using the unique temporary session token from the independent authentication source to populate a communication between the user and the interface provider during the first device session with substitute information corresponding to financial transaction information associated with the user in lieu of the financial transaction information, wherein using the unique temporary session token comprises matching a first identifier corresponding to the first device session to a second identifier corresponding to the unique temporary session token.

3. The method of claim 2, further comprising establishing the second device session between the interface provider and the independent authentication source such that the second device session corresponds to an identifier generated based on a first session identifier corresponding to the first device session.

4. The method of claim 2, wherein using the unique temporary session token comprises using the unique temporary session token to obtain the substitute information corresponding to payment information associated with the user and populating the communication with the substitute information in lieu of the payment information.

5. The method of claim 2, the operations further comprising:

generating for display, in a user interface, a plurality of independent authentication sources;

receiving a user selection of the independent authentication source of the plurality of independent authentication sources;

querying the user for the authentication information based on (i) the user selection of the independent authentication source and (ii) the authentication information being an authentication information type for the user that is available to the independent authentication source.

6. The method of claim 2, wherein using the unique temporary session token comprises using the unique temporary session token to populate the communication between the user and the interface provider with substitute payment information corresponding to payment information associated with the user in lieu of the payment information.

7. The method of claim 2, the operations further comprising:

establishing the second device session between the interface provider and the independent authentication source by determining a participant identifier for the second device session and assigning the participant identifier to the independent authentication source.

8. The method of claim 2, the operations further comprising:

establishing the second device session between the interface provider and the independent authentication source by determining a first session identifier for the first device session and assigning a reference identifier for the second device session based on the first session identifier.

9. The method of claim 2, the operations further comprising:

establishing the second device session between the interface provider and the independent authentication source by determining a first user identifier for the user and assigning a second user identifier for the second device session based on the first user identifier.

10. The method of claim 2, wherein using the unique temporary session token to populate the communication between the user and the interface provider during the first device session comprises:

determining private information corresponding to the user required for the communication; and using the unique temporary session token to obtain the private information and populating the communication with the private information.

11. The method of claim 2, wherein using the unique temporary session token to populate the communication between the user and the interface provider during the first device session comprises:

determining a first user identifier corresponding to the first device session;

determining a second user identifier corresponding to the unique temporary session token; and matching the first user identifier to the second user identifier.

12. The method of claim 2, wherein using the unique temporary session token to populate the communication between the user and the interface provider during the first device session comprises:

determining a first session identifier corresponding to the first device session;

determining a second session identifier corresponding to the unique temporary session token; and matching the first session identifier to the second session identifier.

13. The method of claim 2, the operations further comprising:

generating a native account for the user with the interface provider; and storing the unique temporary session token in the native account.

14. One or more non-transitory, computer-readable mediums comprising instructions recorded thereon that, when executed by one or more processors, cause operations comprising:

in connection with a transaction, establishing a first device session between a user and an interface provider using a non-native account;

querying, during the first device session, the user for authentication information;

in response to receiving the authentication information, establishing a second device session between the interface provider and an independent authentication source;

transmitting, using the second device session, the authentication information to the independent authentication source;

receiving a unique temporary session token, from the independent authentication source, based on a user authentication of the user by the independent authentication source using the authentication information, wherein the unique temporary session token is not provided to a user device of the user in the first device session; and using, during the first device session, the unique temporary session token to populate input fields with substitute information configured for use by the user to complete the transaction, the substitute information corresponding to financial transaction information associated with the user, wherein using the unique temporary session token comprises matching a first identifier corresponding to the first device session to a second identifier corresponding to the unique temporary session token.

15. The one or more non-transitory, computer-readable mediums of claim 14, wherein establishing the first device session between the user and the interface provider using the non-native account comprises:

generating for display, on a user interface, a first option to invoke the first device session between the user and the interface provider using a native account, wherein the native account is facilitated by the interface provider;

generating for display, on the user interface, a second option to invoke the first device session between the user and the interface provider using the non-native account, wherein the non-native account is facilitated by at least one independent authentication source independent from the interface provider and not facilitated by the interface provider; and receiving, via a user interface, a first user request, wherein the first user request establishes the first device session using the non-native account, wherein the first device session corresponds to a first session identifier.

16. The one or more non-transitory, computer-readable mediums of claim 14, wherein querying the user comprises:

generating for display, in a user interface, a plurality of independent authentication sources; and receiving a second user request, wherein the second user request selects the independent authentication source of the plurality of independent authentication sources.

17. The one or more non-transitory, computer-readable mediums of claim 14, wherein querying the user comprises:

determining an authentication information type for the user that is available to the independent authentication source; and querying the user for the authentication information based on the authentication information type being available to the independent authentication source.

18. The one or more non-transitory, computer-readable mediums of claim 14, wherein establishing the second device session between the interface provider and the independent authentication source comprises:

determining a session run time for the second device session; and comparing a current run time of the second device session to the session run time.

19. The one or more non-transitory, computer-readable mediums of claim 14, wherein establishing the second device session between the interface provider and the independent authentication source such that the second device session corresponds to an identifier generated based on a first session identifier corresponding to the first device session.

20. The one or more non-transitory, computer-readable mediums of claim 14, wherein using the unique temporary session token comprises using the unique temporary session token to obtain the substitute information corresponding to payment information associated with the user and populating the input fields with the substitute information in lieu of the payment information.

* * * * *